US010832117B2

(12) United States Patent
Ratni et al.

(10) Patent No.: US 10,832,117 B2
(45) Date of Patent: Nov. 10, 2020

(54) ANTENNA

(71) Applicant: Sony Semiconductor Solutions Corporation, Kanagawa (JP)

(72) Inventors: Mohamed Ratni, Stuttgart (DE); Masayoshi Abe, Stuttgart (DE); Osamu Kozakai, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/358,740

(22) Filed: Mar. 20, 2019

(65) Prior Publication Data

US 2019/0294948 A1 Sep. 26, 2019

(30) Foreign Application Priority Data

Mar. 23, 2018 (EP) .................................... 18163692

(51) Int. Cl.

| | |
|---|---|
| ***G06K 19/077*** | (2006.01) |
| ***H01Q 7/00*** | (2006.01) |
| ***H01Q 1/24*** | (2006.01) |
| ***H04B 5/00*** | (2006.01) |
| ***H01Q 7/08*** | (2006.01) |

(52) U.S. Cl.
CPC ....... *G06K 19/07779* (2013.01); *H01Q 1/243* (2013.01); *H01Q 7/00* (2013.01)

(58) Field of Classification Search
CPC ..... G06K 19/07779; H01Q 1/243; H01Q 7/00
See application file for complete search history.

(56) References Cited

U.S. PATENT DOCUMENTS

| | | | |
|---|---|---|---|
| 9,088,066 B2 | 7/2015 | Levionnais et al. | |
| 2014/0125538 A1 | 5/2014 | Kanj et al. | |
| 2015/0048985 A1 | 2/2015 | Park et al. | |
| 2015/0155628 A1 | 6/2015 | Cho et al. | |
| 2018/0212326 A1* | 7/2018 | Orihara | H01Q 1/2216 |

* cited by examiner

*Primary Examiner* — Laura A Gudorf
(74) *Attorney, Agent, or Firm* — Xsensus LLP

(57) ABSTRACT

An antenna comprises a coil element comprising a core element and coil wound around the core element, the core element arranged along a longitudinal direction and having a first front surface and a second front surface. A first metallic plate element and a second metallic plate element are provided. The first metallic plate element is arranged on a first side of the core element and extends with its first end in the longitudinal direction beyond the first front surface of the core element and its second end in the longitudinal direction adjacent the core element. The second metallic plate element is arranged on a second side of the core element opposite said second side and extends with its first end in the longitudinal direction beyond the second front surface of the core element and its second end in the longitudinal direction adjacent the core element.

18 Claims, 5 Drawing Sheets

ANTENNA

CROSS-REFERENCE TO RELATED APPLICATION

The present application claims priority to European Patent Application 18163692.9 filed by the European Patent Office on Mar. 23, 2018, the entire contents of which being incorporated herein by reference.

BACKGROUND

Field of the Disclosure

The present disclosure relates to an antenna, in particular a miniature NFC (near field communication) antenna.

Description of Related Art

Near field communication has nowadays become available in many communication media, such as smartphones and tablets, and in many other communication systems. Most of the mobile and stationary devices have now an NFC function implemented. Applications using this technology have also evolved from simple personal identification to more complex features such as payment and transport where the security aspects have been challenged. Most of the large payment companies, such as banks, are now providing their customers with NFC technology enabled cards. Further, the transport sector is also heavily investing to change their current fare ticketing methods to more comfortable payment fare media systems. Mobile handset manufacturers have started implementing NFC functionality in their devices for fare media ticketing and also payment.

RFID, Wearable and Internet of Things (IoT) as new and future technologies are also seeking new applications to use this easy, comfortable and user friendly communication technology. Technology leaders and research institutes are working to find new applications and user scenarios using NFC technology. However, this device technology requires not only an NFC chip but also an antenna to transmit and receive information.

Conventional NFC antennas have a quite bulk 2D or 3D design. However, the size of modern mobile devices does not allow the implementation of a big form factor NFC antenna. Wearable and IoT devices are targeting small and always tiny devices obviously requiring miniature or ultra-small NFC antennas, i.e. a small NFC antenna size is becoming a strong request from the leading communication industry, which is at the same time a real challenging requirement for small communication devices.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a small antenna, in particular for use in near field communication.

According to an aspect there is provided an antenna comprising

- a coil element comprising a core element and coil wound around the core element, said core element being arranged along a longitudinal direction and having a first front surface and a second front surface,
- a first metallic plate element arranged on a first side of the core element, wherein said first metallic plate element extends with its first end in said longitudinal direction beyond the first front surface of the core element and is arranged with it second end in said longitudinal direction adjacent the core element,
- a second metallic plate element arranged on a second side of the core element opposite said second side, wherein said second metallic plate element extends with its first end in said longitudinal direction beyond the second front surface of the core element and is arranged with it second end in said longitudinal direction adjacent the core element, and wherein said first metallic plate element and said second metallic plate element overlap each other in the longitudinal direction.

One of the aspects of the disclosure is to provide a new small or ultra-small NFC antenna, which comprises a small coil element including a (magnetic) core element, preferably made of Ferrite. The coil wire is wound around the core element. This arrangement leads to (ferrite) loop type antenna, which is often used for AM receivers. Such small antenna loops are known to be inefficient radiators. Hence, according to the present disclosure such type of (ferrite) loop antenna is provided with additional metal plate elements above and below the loop antenna (i.e. one two opposite sides of the coil element representing the loop antenna). The metal plate elements hereby overlap each other and also extend beyond the respective end surface side of the core element of the loop antenna. In this way an antenna with the desired small size is provided that is capable to redirect the radiated magnetic field and increase the efficiency of the antenna in a given direction.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
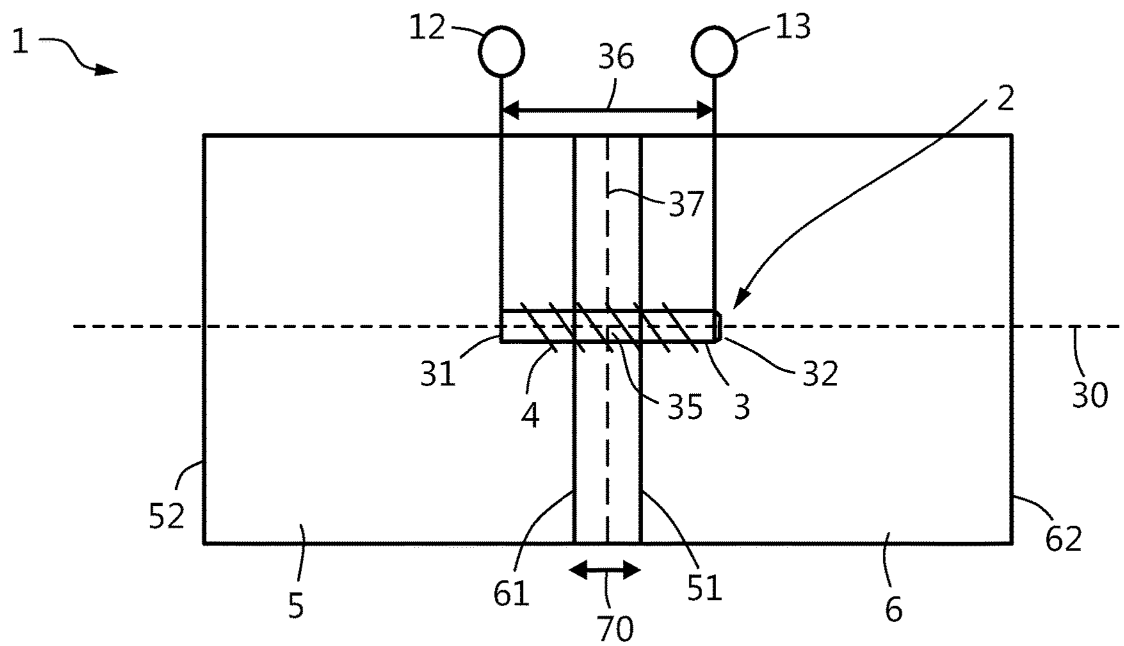
FIGS. 1A-1C show a different view of a first embodiment of an antenna according to the present disclosure.
Figure 1B:
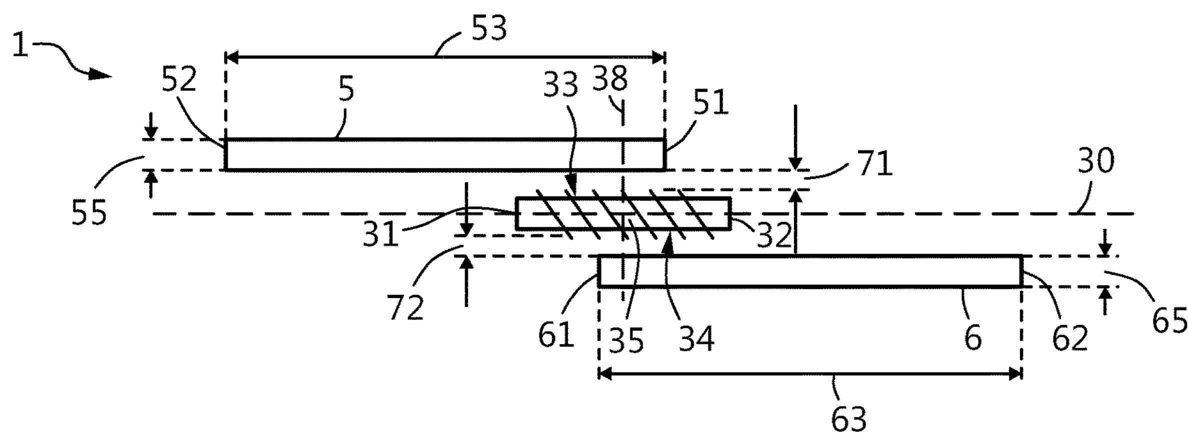
Figure 1C:
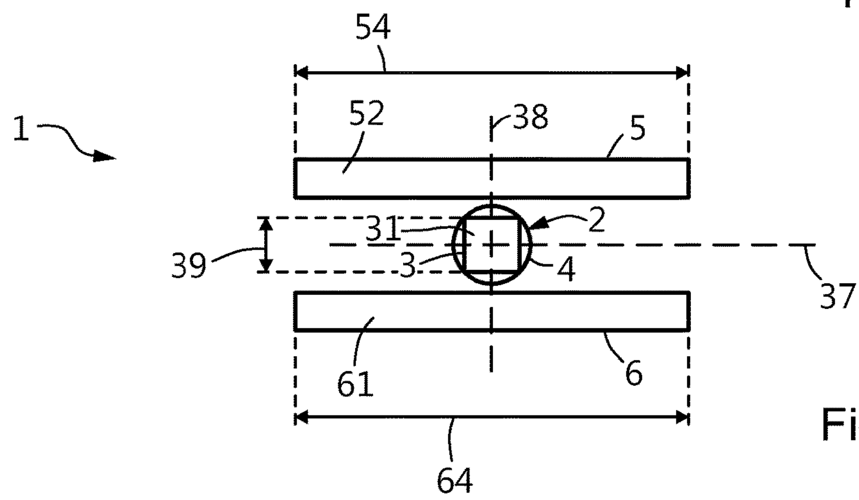

Referring now to the drawings, wherein like reference numerals designate identical or corresponding parts throughout the several views, FIG. 1 shows different view of a first embodiment of an antenna 1 according to the present disclosure, wherein FIG. 1A shows a top view, FIG. 1B shows side view and FIG. 1C shows a front view of the antenna 1.

The antenna 1 comprises a coil element 2, a first metallic plate element 5 and a second metallic plate element 6 and is configured to handle signals for RF communication, e.g. for near field communication. From the terminals 12 and 13 an RF signal is inputted or outputted to the coil 4.

The coil element 2 comprises a core element 3 and coil 4 wound around the core element. The core element 3 is arranged along a longitudinal direction 30 and has a first front surface 31 and a second front surface 32. Further, the core element 3 is generally made of magnetic material, e.g. as a ferrite rod, with a high magnetic permeability to confine and guide a magnetic field generated by the current carried by the coil 4. The core element 3 may have a quadratic or round cross section with a diameter 39 in the range of 5% to 30% the length of the coil element 3. The coil 4 may be formed as a solenoid coil, and the number of windings of the coil 4 may be in the range of 2 to 100, preferably in the range of 5 to 30.

The first metallic plate element 5 is arranged on a first side 33 of the core element 3. It extends with its first end 51 in said longitudinal direction 30 beyond the first front surface 31 of the core element 3 and is arranged with it second end 52 in said longitudinal direction 30 adjacent to the core element 3. The second metallic plate element 6 is arranged on a second side 34 of the core element 3 opposite said second side 34. It extends with its first end 61 in said longitudinal direction 30 beyond the second front surface 32 of the core element 3 and is arranged with it second end 62 in said longitudinal direction 30 adjacent to the core element 3. The coil element 2 is thus sandwiched between the first and second metallic plate elements 5, 6.

The first metallic plate element 5 and said second metallic plate element 6 are arranged such that they overlap each other in the longitudinal direction 30, i.e. the two metallic plates 5, 6 are positioned (or staggered) in two superposed cantilever overhangs. In an embodiment the size of the overlap 70 between the first metallic plate element 5 and the second metallic plate element 6 in the longitudinal direction 30 is in the range of 0.1% to 50% (or even more) of the length of the core element 3 in the longitudinal direction 30. Theoretically, even no overlap between the first metallic plate element 5 and the second metallic plate element 6 in the longitudinal direction 30 would work.

Figure 8:
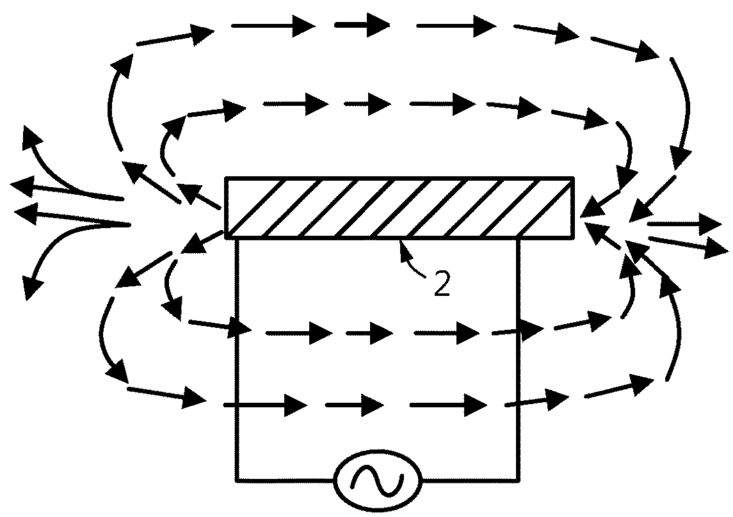
FIG. 8 illustrates the magnetic field of a conventional solenoid coil antenna.

FIG. 8 illustrates the magnetic field of a conventional soleonid coil antenna (sometimes also called loop antenna) to explain basic principal functionality. It is well known that an electric current carried in the wire of a coil generates a magnetic field around it. The amount of magnetic field generated by the current depends on several parameters such as the number of turns, wire section, wire length but also on the geometry of the currents shape path. If the coil is fed with an electrical current, it creates a magnetic field which will travel from one edge (i.e. one front surface of the core) to another edge as shown in FIG. 8.

The magnetic field lines are horizontally distributed from one edge to another edge. Such a magnetic field distribution is weak, and it is difficult to collect the maximum field amount. The magnetic field lines are tied to the core 3. The capture of the whole magnetic field is problematic, even if a second received antenna is positioned horizontally.

Figure 9:
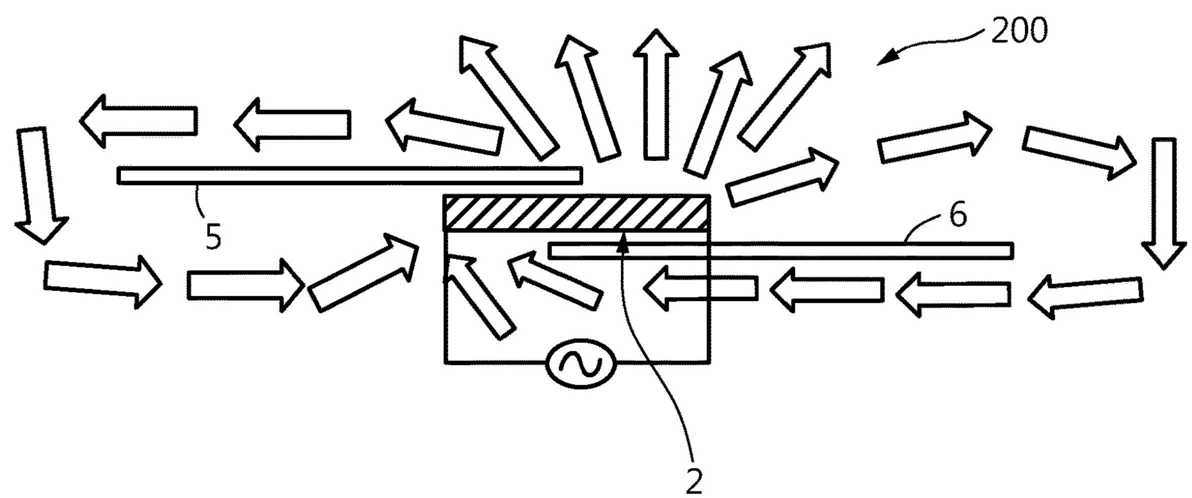
FIG. 9 illustrates the magnetic field of an antenna according to the present disclosure.

In order to solve this problem the track of the magnetic field lines is inverted from horizontal to vertical by the antenna arrangement of the present disclosure. The magnetic field goes directly from one edge to another using the shortest pathway, but the present disclosure modifies the pathway of these magnetic field lines in order to collect the majority of the magnetic field. By placing the coil element 2 in between the two metallic plate elements 5, 6 in a cantilever overhang, as shown in FIG. 1, the magnetic field will be redirected from its shortest route to follow the newly shaped pathway, as schematically shown in FIG. 9, using the metallic plate elements 5, 6 as guides. As the magnetic field will always run as a loop, the modified pathway will force the emerged magnetic fields to go first vertically and make a big turn before catching up the other edge of the core 3 to close the magnetic loop. By doing so, the pathway of the magnetic field lines has partly (in the area 200) been changed into vertical direction where a receive antenna can collect the majority of this magnetic field. The antenna according to the present disclosure can thus be made of small size and achieves an improved performance, which are essential advantages e.g. for implementation of an antenna in small NFC devices.

There are various parameters and dimensions of the disclosed antenna, which may be optimized to design the magnetic field and improve the desired effect, in particular strength and direction of the magnetic field. These will be explained in the following.

The second end 52 of the first metallic plate 5 preferably extends by a factor in the range of 100% to 500% of the length 36 of the core element 3 in the longitudinal direction 30 beyond the center 35 of the core element 3. The second end 62 of the second metallic plate 6 preferably extends by a factor in the range of 100% to 500% of the length 36 of the core element 3 in the longitudinal direction 30 beyond the center 35 of the core element 3.

The first end 51 of the first metallic plate 5 extends by a factor in the range of 50% to 75% of the length 36 of the core element 3 in the longitudinal direction 30 beyond the first front surface 31 of the core element 3. The first end 61 of the second metallic plate 6 extends by a factor in the range of 50% to 75% of the length 36 of the core element 3 in the longitudinal direction 30 beyond the second front surface 32 of the core element 3.

In an embodiment the first metallic plate element 5 and/or the second metallic plate element 6 extends beyond the coil element 2 in lateral direction 37 orthogonal to the longitudinal direction 30, as shown in FIG. 1C.

The first metallic plate element 5 and/or the second metallic plate element 6 generally may have any shape. Preferably, they have a rectangular or quadratic shape, as shown in FIG. 1A. This provides the advantage that the plates can be manufactured simpler and the effects on the magnetic field can be determined easier. The thickness of the first metallic plate element 5 and/or the second metallic plate element 6 is preferably in the range of at least ten micrometers or more. Preferably the first and second metallic plates have identical shape and identical dimensions.

The first metallic plate element 5 and/or the second metallic plate element 6 is preferably arranged with respect to the coil element 2 with a gap 71, 72 in between. The gap should generally be small to avoid that too much of the magnetic field flux goes through said gap. The gap 71, 72 is preferably in a range of 5% to 20% of the size of the overlap 70, wherein the gaps 71, 72 are preferably of identical size. Another way of designing the size of the gaps 71, 72 is that the size of the gaps 71, 72 is in the range of 2-4 times (e.g. 3 times) smaller than the thickness 39 of the core 3.

FIG. 2 shows cross-sectional side views of three embodiments of an antenna with bent end portions according to the present disclosure.

Figure 2A:
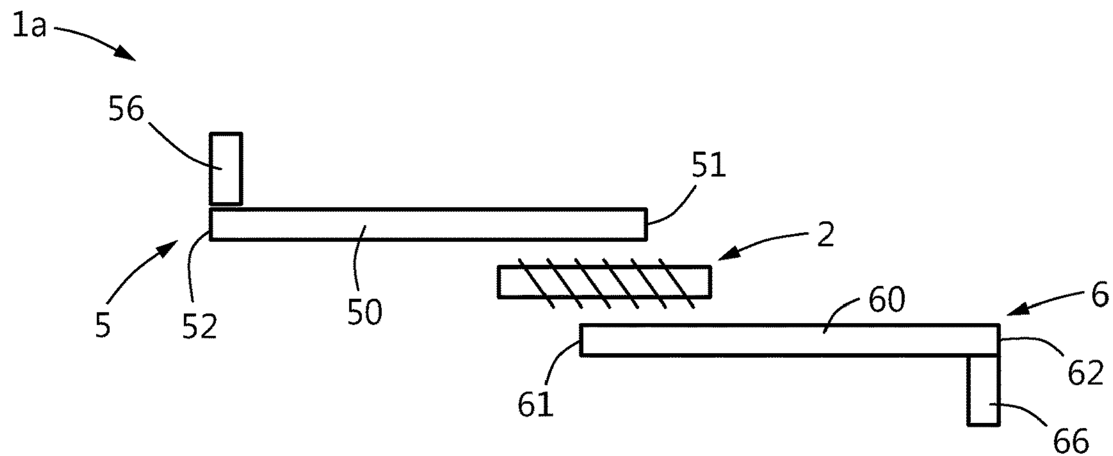
FIGS. 2A-2C show a cross-sectional side views of three embodiments of an antenna with bent end portions according to the present disclosure.

FIG. 2A shows an antenna 1*a*, in which the first metallic plate element 5 and the second metallic plate element 6 each comprises, at its second end 52, 62 a respective bent portion 56, 66 that is bent in a direction transverse (in this embodiment perpendicular) to the longitudinal direction 30) and away from the coil element 2.

Figure 2B:
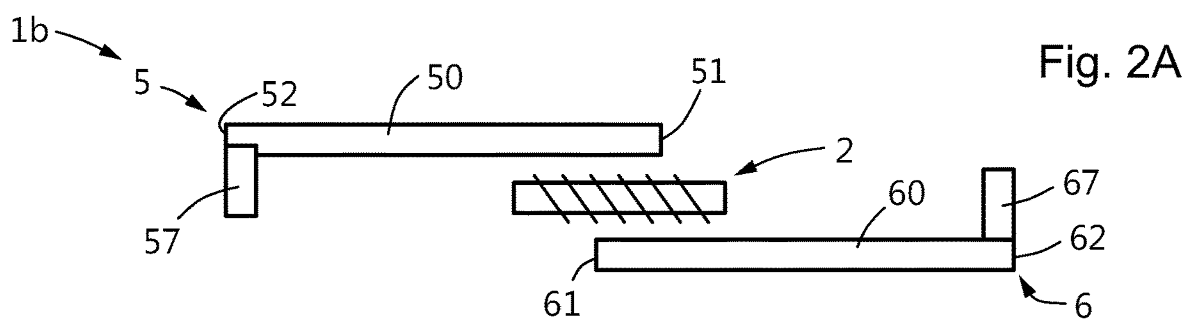

FIG. 2B shows an antenna 1*b*, in which the first metallic plate element 5 and the second metallic plate element 6 each comprises, at its second end 52, 62 a respective bent portion 57, 67 that is bent in a direction transverse (in this embodiment perpendicular) to the longitudinal direction 30) and towards the coil element 2.

Figure 2C:
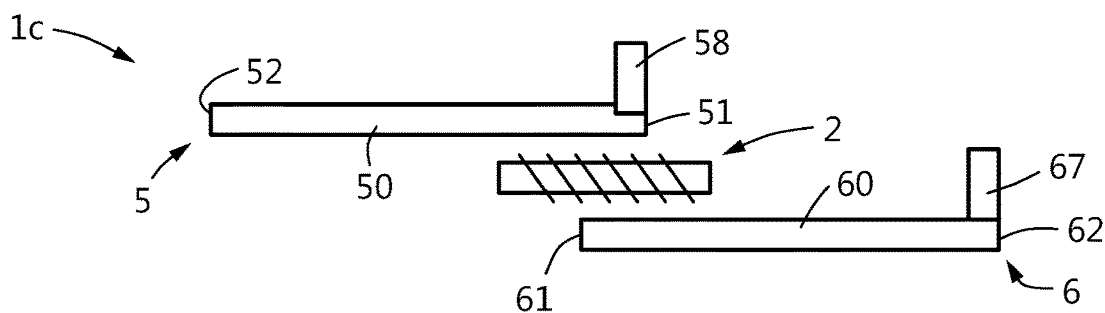

FIG. 2C shows an antenna 1*c*, in which the first metallic plate element 5 comprises, at its first end 51, a bent portion 58 that is bent in a direction transverse to the longitudinal direction 30 and away from the coil element 2 and the second metallic plate element 6 comprises, at its second end 62, a bent portion 67 that is bent in a direction transverse to the longitudinal direction 30 and towards the coil element 2.

Other embodiments with other arrangements, numbers and forms of bent portion are possible. For instance, only one of the metallic plates may have one or more of such bent portions, or the bent portion may be curved rather than straight. All these embodiments have the technical effect that they modify the magnetic field and contribute to strengthen the desired vertical component of the magnetic field and redirect the magnetic field out of the area at the end surface 32.

Figure 3:
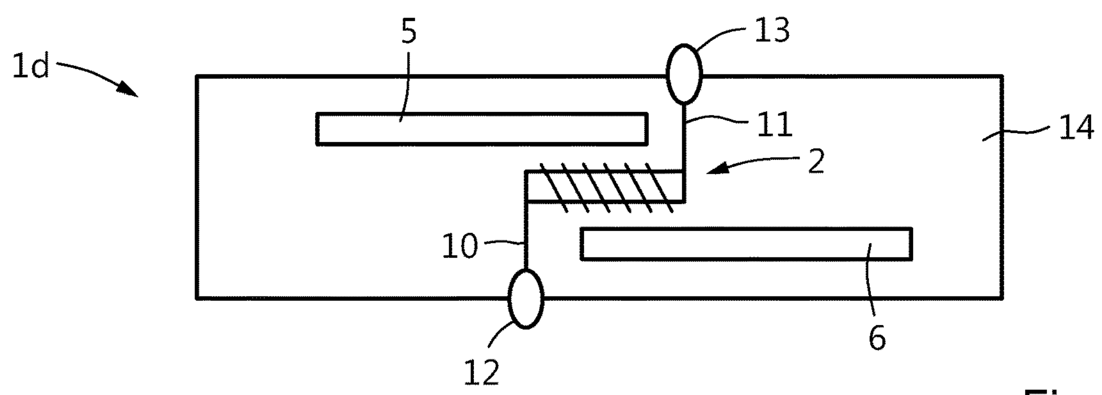
FIG. 3 shows a cross-sectional side view of an embodiment of an antenna embedded in mold mass according to the present disclosure.

FIG. 3 shows a cross-sectional side view of an embodiment of an antenna 1*d* embedded in mold mass 14 according to the present disclosure. The antenna 1*d* may e.g. be completely integrated in plastic/resin material. The signal is fed from the electrode of the coil 4 to each external electrode (or connecting ports) 12, 13 through each interconnection pad (or feeding lines) 10, 11. The mold mass 14 protects the antenna 1*d*. This kind of embodiment can be implemented as stand-alone antenna in any NFC device by connecting only the two input feeds wiring.

Figure 4A:
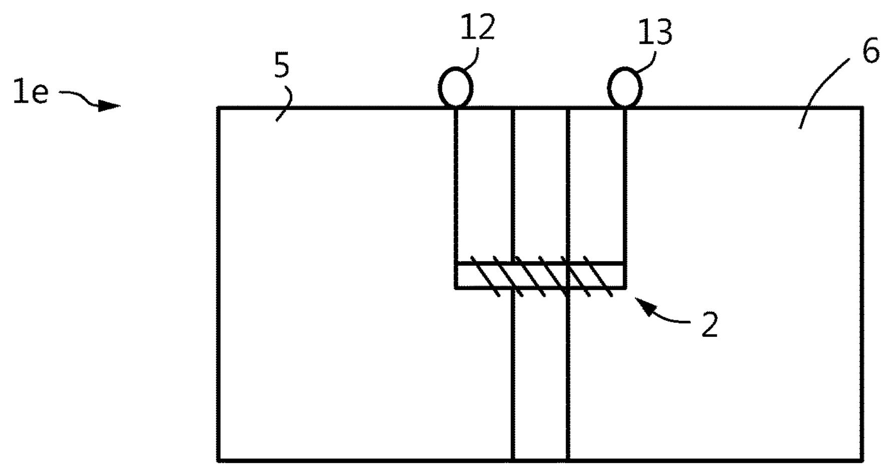
FIGS. 4A-4B show a top view and a cross-sectional side view of an embodiment of an antenna according to the present disclosure, where metal elements are placed on PCB elements.
Figure 4B:
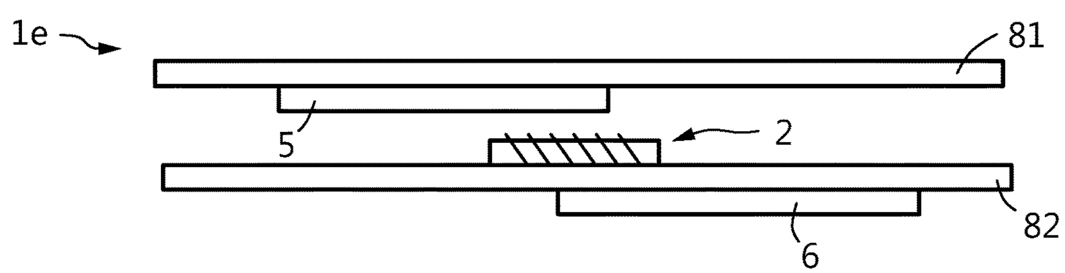

FIG. 4 shows a top view (FIG. 4A) and a cross-sectional side view (FIG. 4B) of an embodiment of an antenna 1*e* according to the present disclosure, where metal elements representing the metallic plates 5, 6 are placed on PCB elements 81, 82. As shown in FIG. 4B, the metal elements may be place on a first surface facing the coil element 2 or on a second surface facing away from the coil element 2. This provides that the metallic plate elements can be securely held in place by the PCB elements 81, 82.

Figure 5:
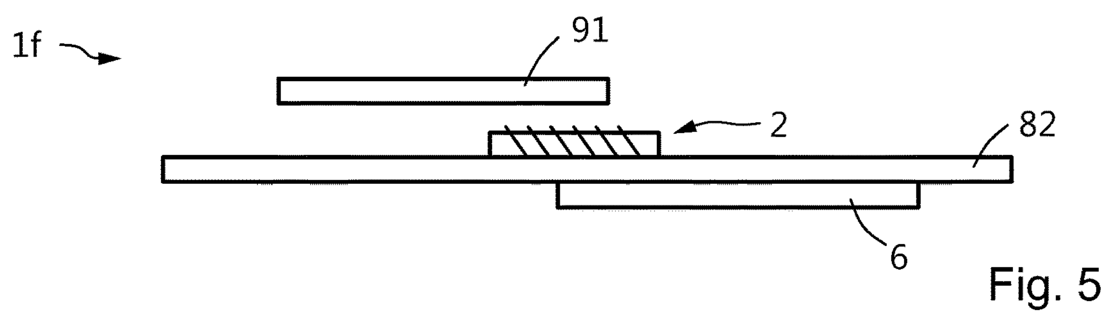
FIG. 5 shows a cross-sectional side view of an embodiment of an antenna according to the present disclosure, where a part of a housing represents a metallic plate element of the antenna.

FIG. 5 shows a cross-sectional side view of an embodiment of an antenna 1*f* according to the present disclosure, where a part of a housing 91 (e.g. the metal body or chassis of a device integrating the antenna 10 represents a metallic plate element (here the metallic plate element 5) of the antenna. The coil element 2 and the second metallic plate 6 may be assembled on a printed circuit board 82. This provides that no extra metallic plate element 5 needs to be provided but can be represented by part of the device itself.

Figure 6:
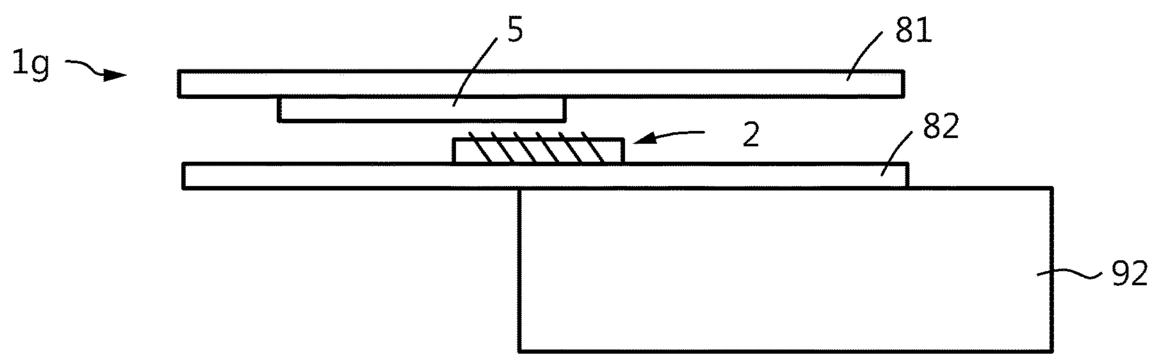
FIG. 6 shows a cross-sectional side view of an embodiment of an antenna according to the present disclosure, where a battery represents a metallic plate element of the antenna.

FIG. 6 shows a cross-sectional side view of an embodiment of an antenna 1*g* according to the present disclosure, where a battery 92 represents a metallic plate element (here the second metallic plate element 6) of the antenna. The coil element 2 is assembled on printed circuit board 82, on the other side of which the battery 92 is placed. The first metallic plate element 5 is placed on another PCB element 81 or is part of the device itself, which is preferably not made from metal.

Figure 7:
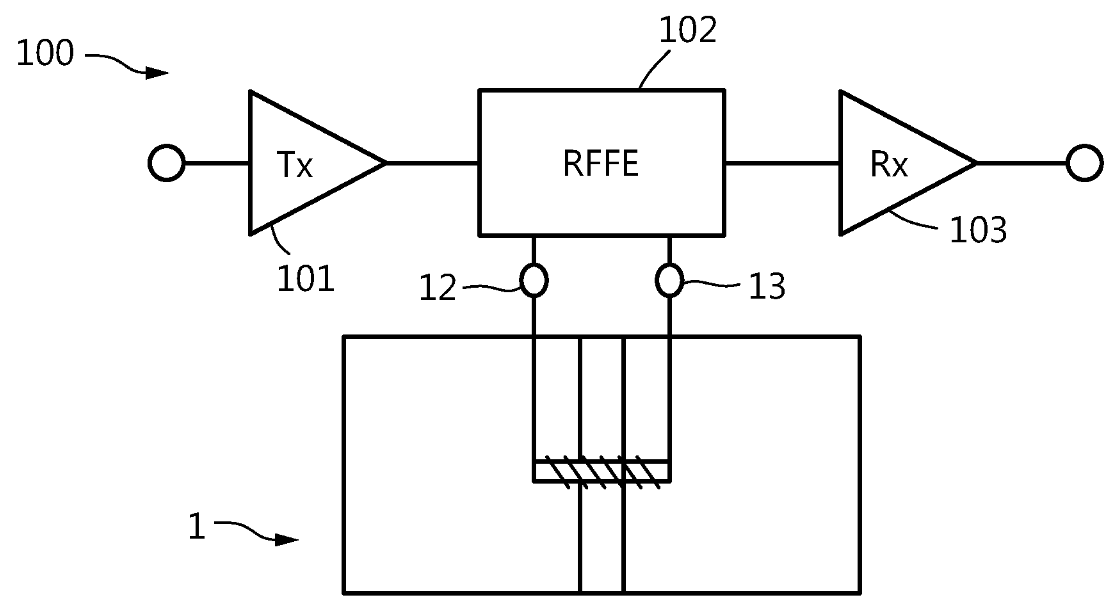
FIG. 7 shows a schematic diagram of an antenna system including an antenna according to the present disclosure.

FIG. 7 shows a schematic diagram of an antenna system 100 including an antenna 1 according to the present disclosure. The antenna system 100, which may e.g. be used in a near field communication device, further comprises a transmitter (Tx) 101, a receiver (Rx) 103, and an RF frontend network (RFFE) 101, which includes Tx/Rx duplexing function, frequency resonance function, and impedance matching function and which is coupled to the terminals 12, 13.

With the different embodiment further optimizations and improvements, particularly with respect to the size of the antenna and the metallic plates, the desired design of the obtained magnetic field can be achieved.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

It follows a list of further embodiments of the disclosed subject matter:

1. An antenna comprising:
   a coil element (2) comprising a core element (3) and coil (4) wound around the core element, said core element (3) being arranged along a longitudinal direction (30) and having a first front surface (31) and a second front surface (32),
   a first metallic plate element (5) arranged on a first side (33) of the core element (3), wherein said first metallic plate element (5) extends with its first end (51) in said longitudinal direction (30) beyond the first front surface (31) of the core element (3) and is arranged with it second end (52) in said longitudinal direction (30) adjacent the core element (3),
   a second metallic plate element (6) arranged on a second side (34) of the core element (3) opposite said second side (34), wherein said second metallic plate element (6) extends with its first end (61) in said longitudinal direction (30) beyond the second front surface (32) of the core element (3) and is arranged with it second end (62) in said longitudinal direction (30) adjacent the core element (3), and wherein said first metallic plate element (5) and said second metallic plate element (6) overlap each other in the longitudinal direction (30).

2. The antenna as defined in any preceding embodiment, wherein the second end (52) of the first metallic plate (5) extends beyond the center (35) of the core element (3).

3. The antenna as defined in any preceding embodiment, wherein the second end (52) of the first metallic plate (5) extends by a factor in the range of 100% to 4500% of the length (36) of the core element (3) in the longitudinal direction (30) beyond the center (35) of the core element (3).

4. The antenna as defined in any preceding embodiment, wherein the second end (62) of the second metallic plate (6) extends beyond the center (35) of the core element (3).

5. The antenna as defined in any preceding embodiment, wherein the second end (62) of the second metallic plate (6) extends by a factor in the range of 100% to 500% of the length (36) of the core element (3) in the longitudinal direction (30) beyond the center (35) of the core element (3).

6. The antenna as defined in any preceding embodiment, wherein the size of the overlap (70) between said first metallic plate element (5) and said second metallic plate element (6) in the longitudinal direction (30) is in the range of 0.1% to 50% of the length of the core element (3) in the longitudinal direction (30).

7. The antenna as defined in any preceding embodiment, wherein the first end (51) of the first metallic plate (5) extends by a factor in the range of 0.1% to 50% of the length (36) of the core element (3) in the longitudinal direction (30) beyond the first front surface (31) of the core element (3).

8. The antenna as defined in any preceding embodiment, wherein the first end (61) of the second metallic plate (6) extends by a factor in the range of 0.1% to 50% of the length (36) of the core element (3) in the longitudinal direction (30) beyond the second front surface (32) of the core element (3).

9. The antenna as defined in any preceding embodiment, wherein the first metallic plate element (5) and/or the second metallic plate element (6) extends beyond the coil element (2) in lateral direction (37) orthogonal to the longitudinal direction (30).

10. The antenna as defined in any preceding embodiment, wherein the first metallic plate element (5) and/or the second metallic plate element (6) have a rectangular or quadratic shape.

11. The antenna as defined in any preceding embodiment, wherein the first metallic plate element (5) and/or the second metallic plate element (6) have a thickness (55, 65) of at least 10 μm.

12. The antenna as defined in any preceding embodiment, wherein the first metallic plate element (5) and/or the second metallic plate element (6) is arranged with respect to the coil element (2) with a gap (71, 72) in between, said gap being in a range of 5% to 20% of the size of the overlap.

13. The antenna as defined in any preceding embodiment, wherein the core element (3) has a quadratic or round cross section with a diameter (39) in the range of 5% to 30% of the length of the coil element.

14. The antenna as defined in any preceding embodiment, wherein the number of windings of the coil (4) is in the range of 15 to 30.

15. The antenna as defined in any preceding embodiment, wherein the first metallic plate element (5) and/or the second metallic plate element (6) comprises, at its first end (51, 61) and/or at its second end (52, 62), a bent portion (56, 57, 58, 66, 67) that is bent in a direction transverse to the longitudinal direction (30).

16. The antenna as defined in any preceding embodiment, wherein said bent portion (56, 57, 58, 66, 67) is bent towards the coil element (2) or away from the coil element (2).

17. The antenna as defined in any preceding embodiment, wherein the first metallic plate element (5) and/or the second metallic plate element (6) and/or the coil element (2) is arranged on a printed circuit board (81, 82) or at a part of the housing (91) and/or an internal element (92) of a device including the antenna.

18. The antenna as defined in any preceding embodiment, wherein the first metallic plate element (5) and/or the second metallic plate element (6) is represented by a part of the housing (91) and/or an internal element (92) of a device including the antenna.

The invention claimed is:

1. An antenna comprising:

a coil element comprising a core element and coil wound around the core element, said core element being arranged along a longitudinal direction and having a first front surface and a second front surface, a first metallic plate element arranged on a first side of the core element, wherein said first metallic plate element extends with a first end of the first metallic plate in said longitudinal direction beyond the first front surface of the core element and is arranged with a second end of the first metallic plate in said longitudinal direction adjacent the core element, a second metallic plate element arranged on a second side of the core element opposite said second side, wherein said second metallic plate element extends with a first end of the second metallic plate in said longitudinal direction beyond the second front surface of the core element and is arranged with a second end of the second metallic plate in said longitudinal direction adjacent the core element, and wherein said first metallic plate element and said second metallic plate element overlap each other in the longitudinal direction.

2. The antenna as claimed in claim 1, wherein the second end of the first metallic plate extends beyond the center of the core element.

3. The antenna as claimed in claim 1, wherein the second end of the first metallic plate extends by a factor in the range of 100% to 500% of the length of the core element in the longitudinal direction beyond the center of the core element.

4. The antenna as claimed in claim 1, wherein the second end of the second metallic plate extends beyond the center of the core element.

5. The antenna as claimed in claim 1, wherein the second end of the second metallic plate extends by a factor in the range of 100% to 500% of the length of the core element in the longitudinal direction beyond the center of the core element.

6. The antenna as claimed in claim 1, wherein the size of the overlap between said first metallic plate element and said second metallic plate element in the longitudinal direction is in the range of 0.1% to 50% of the length of the core element in the longitudinal direction.

7. The antenna as claimed in claim 1, wherein the first end of the first metallic plate extends by a factor in the range of 0.1% to 50% of the length of the core element in the longitudinal direction beyond the first front surface of the core element.

8. The antenna as claimed in claim 1, wherein the first end of the second metallic plate extends by a factor in the range of 0.1% to 50% of the length of the core element in the longitudinal direction beyond the second front surface of the core element.

9. The antenna as claimed in claim 1, wherein at least one of the first metallic plate element and and/or the second metallic plate element extends beyond the coil element in lateral direction orthogonal to the longitudinal direction.

10. The antenna as claimed in claim 1, wherein at least one of the first metallic plate element and the second metallic plate element have a rectangular or quadratic shape.

11. The antenna as claimed in claim 1, wherein at least one of the first metallic plate element and the second metallic plate element have a thickness, in the range of at least 10 μm.

12. The antenna as claimed in claim 1, wherein at least one of the first metallic plate element and, the second metallic plate element is arranged with respect to the coil element with a gap in between, said gap being in a range of 5% to 20% of the size of the overlap.

13. The antenna as claimed in claim 1, wherein the core element has a quadratic or round cross section with a diameter in the range of 5% to 30% of the length of the coil element.

14. The antenna as claimed in claim 1, wherein the number of windings of the coil is in the range of 15 to 30.

15. The antenna as claimed in claim 1, wherein at least one of the first metallic plate element and the second metallic plate element comprises, at at least one of the first end and the second end, a bent portion that is bent in a direction transverse to the longitudinal direction.

16. The antenna as claimed in claim 1, wherein said bent portion is bent towards the coil element or away from the coil element.

17. The antenna as claimed in claim 1, wherein at least one of the first metallic plate element, and/or the second metallic plate element and the coil element is arranged on a printed circuit board or at least one of a part of housing and an internal element of a device including the antenna.

18. The antenna as claimed in claim 1, wherein at least one of the first metallic plate element the second metallic plate element is represented by at least one of a part of a housing and an internal element of a device including the antenna.

* * * * *